United States Patent
Mayell (10) Patent No.: US 8,040,705 B2
(45) Date of Patent: Oct. 18, 2011

(54) CIRCUIT WITH ISOLATION INTERFACE AND REMOTE ON/OFF

(75) Inventor: Robert J. Mayell, San Francisco, CA (US)

(73) Assignee: Power Integrations, Inc., San Jose, CA (US)

(*) Notice: Subject to any disclaimer, the term of this patent is extended or adjusted under 35 U.S.C. 154(b) by 495 days.

(21) Appl. No.: 12/233,957

(22) Filed: Sep. 19, 2008

(65) Prior Publication Data

US 2010/0072966 A1    Mar. 25, 2010

(51) Int. Cl.
*H02M 3/24* (2006.01)
(52) U.S. Cl. .................... 363/97; 363/132; 363/21.07
(58) Field of Classification Search .............. 363/16, 363/17, 20, 72, 21.7, 21.12, 21.14, 21.06, 363/25, 21.15, 78, 95–98, 132; 320/103, 320/104, 139; 323/282–290, 271, 224; 307/64–67, 307/140
See application file for complete search history.

(56) References Cited

U.S. PATENT DOCUMENTS 6,301,135 B1 * 10/2001 Mammano et al. .......... 363/95
6,366,481 B1 *  4/2002 Balakrishnan et al. ... 363/21.15

* cited by examiner

*Primary Examiner* — Rajnikant Patel
(74) *Attorney, Agent, or Firm* — Blakely Sokoloff Taylor & Zafman LLP (57) ABSTRACT

A circuit with an isolation interface and a remote on/off function is disclosed. The circuit includes a controller included in a primary side of the circuit. The controller is coupled to receive a primary side feedback signal and the controller is configured to enter a shutdown mode when the primary side feedback signal exceeds a feedback signal threshold. The circuit also includes an isolation interface coupled to galvanically isolate the primary side from a secondary side of the circuit. The isolation interface translates a secondary side feedback signal from the secondary side into the primary side feedback signal on the primary side. The isolation interface is configured to adjust the primary side feedback signal to exceed the feedback signal threshold in response to an on/off signal.

32 Claims, 8 Drawing Sheets

CIRCUIT WITH ISOLATION INTERFACE AND REMOTE ON/OFF

TECHNICAL FIELD

This disclosure relates generally to electrical circuits and, in particular but not exclusively, relates to isolated power supplies that include feedback and remote on/off functions.

BACKGROUND INFORMATION

Many electrical circuits require galvanic isolation between different areas of the circuit. Galvanic isolation occurs when DC current is unable to flow between these isolated portions. However, feedback signals and other information may still need to be transmitted between the isolated portions of the circuit. One example of such an electrical circuit is a power supply or a power converter. Power supplies may be included in electrical devices such as cell phones, personal digital assistants (PDA's), laptops, etc. Because power is generally delivered through a wall outlet as high-voltage AC power the power supply or power converter is required to transform the high-voltage AC power into low-voltage DC power which may then be used to power the electrical device.

One of the electronic components often included in a power supply is a transformer. During operation the transformer allows the transfer of energy between an input side (referred to as a primary side) of the power supply and an output side (referred to as the secondary side) of the power supply. The input and output sides of the power supply are typically galvanically isolated. In this example, galvanic isolation occurs when DC current is unable to flow between the input side and output side of the power supply.

In operation, a power supply may use a controller to regulate output power delivered to an electrical device, such as a computer, that may be generally referred to as a load. The controller may also be coupled to a feedback circuit that provides feedback information about the output of the power supply so that the controller may regulate the amount of power delivered to the load.

Another feature that may be included in a power supply is a remote on/off feature. A remote on/off feature allows a device on the output side of the power supply (i.e., a load that is being powered by the power supply) to send a signal to the input side of the power supply to turn off circuitry at the input side to conserve energy. For example, a personal computer receiving power at the output side of a power supply may include an on/off switch which sends a signal to the input side of the power supply for it to turn off.

However, as stated above, the input and output sides of the power supply are galvanically isolated. Thus, the feedback information from the output and the remote on/off signal are also isolated from the input side of the power supply.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Examples of a circuit with an isolation interface and remote on/off are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Embodiments of the present invention include a circuit which includes an isolation interface providing at least two functions: 1.) a feedback function; and 2.) a remote on/off function. An isolation interface maintains galvanic isolation between primary and secondary sides of the circuit while performing these two functions. The feedback function includes translating a secondary side feedback signal from the secondary side of the circuit into a primary side feedback signal on the primary side. A controller included in the primary side of the circuit receives the primary side feedback signal. The remote on/off function includes adjusting the primary side feedback signal to exceed a feedback signal threshold of the controller in response to an on/off signal such that the controller enters a shutdown mode. These and other embodiments are described in detail below.

Figure 1:
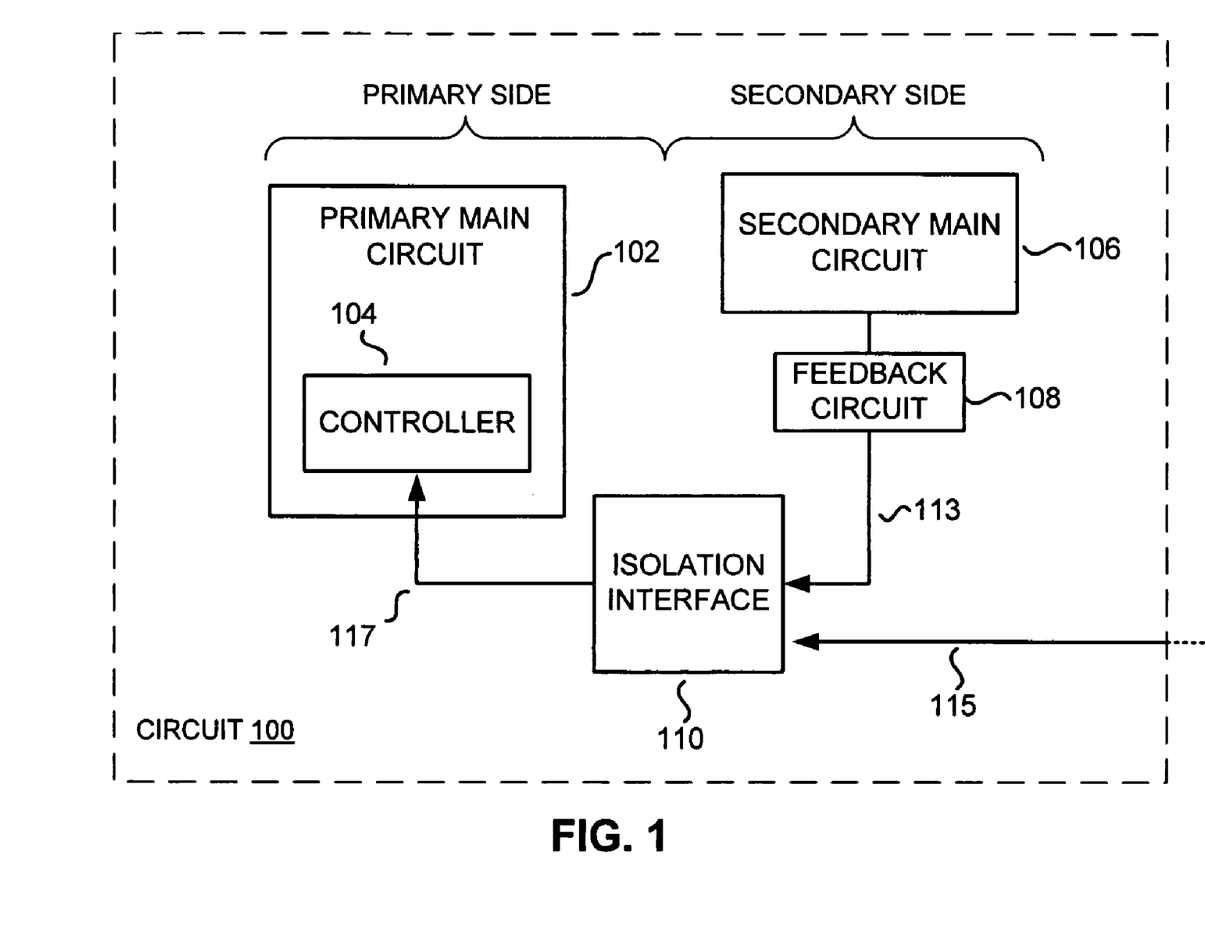
FIG. 1 is a block diagram illustrating a circuit, in accordance with the teachings of the present invention.

FIG. 1 is a block diagram illustrating a circuit 100, in accordance with the teachings of the present invention. The illustrated example of circuit 100 includes a primary side and a secondary side. The primary side is shown as including a primary main circuit 102 which includes a controller 104. The secondary side of circuit 100 is shown as including a secondary main circuit 106 and a feedback circuit 108. FIG. 1 further illustrates an isolation interface 110 as included in circuit 100

As shown in FIG. 1, the primary and secondary sides of circuit 100 are galvanically isolated from one another. That is, DC current is unable to directly flow between the primary and secondary sides. In one example a first portion of circuitry from the isolation interface 110 is coupled to circuitry on the primary side and a second portion of circuitry from the isolation interface 110 is coupled to circuitry on the secondary side. Isolation interface 110 is included in circuit 100 to maintain galvanic isolation while performing at least two functions: 1.) a feedback function and 2.) a remote on/off function, both of which will be described in more detail below.

Controller 104 is shown in FIG. 1 as included in primary main circuitry 102. Controller 104 is coupled to operate primary main circuitry 102 in response to feedback signal 117. In one example, controller 104 modulates a duty factor of a power switch in a power supply in response to feedback signal 117. More specifically, a duty factor may be defined as the percentage of time a power switch is enabled over a certain period of time.

Primary main circuit 102 may include circuitry to perform a variety of functions in response to primary side feedback signal 117. For example, circuit 100 may be a power supply where primary main circuit 102 includes power supply circuitry to regulate an output of the power supply in response to primary side feedback signal 117.

FIG. 1 further illustrates secondary main circuit 106 as coupled to feedback circuit 108. As shown, feedback circuit 108 provides a secondary side feedback signal 113 to isolation interface 110. Secondary main circuit 106 may include circuitry to perform a variety of functions in conjunction with primary main circuit 102. For example, circuit 100 may be a power supply where secondary main circuit 106 includes power supply circuitry to provide a regulated output of the power supply. Continuing with this example, feedback circuit 108 may be configured to provide secondary side feedback signal 113 in response to the regulated output of the power supply.

In operation of the feedback function, isolation interface 110 translates secondary side feedback signal 113 from the secondary side into primary side feedback signal 117 to be received by controller 104. In one example, primary side feedback signal 117 is substantially representative of secondary side feedback signal 113.

The remote on/off function of isolation interface 110 includes adjusting primary side feedback signal 117 to exceed a feedback signal threshold of controller 104 in response to an on/off signal 115 such that controller 104 enters a shutdown mode. By way of example, controller 104 may include a feedback characteristic that includes entering a shutdown mode when primary side feedback signal 117 is greater than a threshold. By way of another example, controller 104 may enter the shutdown mode when primary side feedback signal 117 is less than a threshold. When in the shutdown mode, controller 104 may reduce the duty factor of drive signal 219 to zero.

Still referring to FIG. 1, on/off signal 115 is used to indicate to circuit 100 whether controller 104 should enter the shutdown mode. In one example, on/off signal 115 may be generated by circuitry external to circuit 100. For example, on/off signal 115 may be generated by a remote on/off circuit of a device, such as a computer motherboard (not shown) to prevent wastage of power during operation when not required.

Thus, FIG. 1 illustrates an example circuit 100 that includes a single isolation interface 110 for performing both a feedback function and a remote on/off function, while at the same time maintaining the galvanic isolation between the primary and secondary sides of circuit 100.

Figure 2:
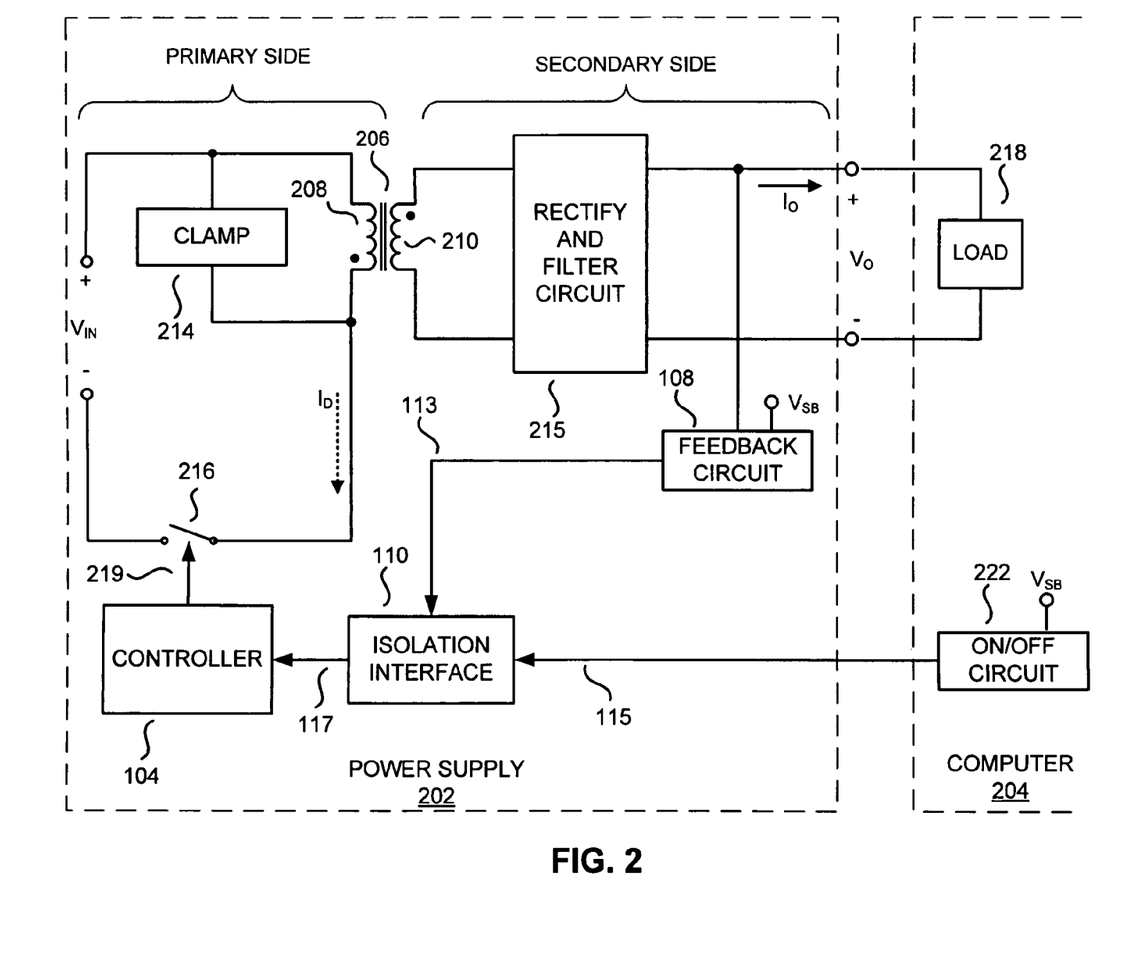
FIG. 2 is a functional circuit diagram illustrating a power supply, in accordance with the teachings of the present invention.

FIG. 2 is a functional circuit diagram illustrating a power supply 202, in accordance with the teachings of the present invention. Power supply 202 is one possible implementation of circuit 100 in FIG. 1. FIG. 2 illustrates power supply 202 as coupled to computer 204. Power supply 202 is illustrated as including controller 104, feedback circuit 108, isolation interface 110, a transformer 206, a clamp circuit 214, a rectify and filter circuit 215, and a power switch 216. Transformer 206 is illustrated as including a primary winding 208 and a secondary winding 210. FIG. 2 further illustrates computer 204 as including an on/off circuit 222 and load 218.

As shown in FIG. 2, the primary and secondary sides of power supply 202 are galvanically isolated from one another. Isolation interface 110 is included in power supply 202 to maintain galvanic isolation while performing at least two functions: 1.) a feedback function and 2.) a remote on/off function. More specifically, galvanic isolation may be required in certain electrical circuits due safety standard regulations.

Controller 104 is shown in FIG. 2 as included on the primary side of power supply 202. Controller 104 is coupled to generate a drive signal 219 that is representative of a duty factor in response to primary side feedback signal 117. In the illustrated example, controller 104 is coupled to control the switching of power switch 216 to regulate an output (e.g., $V_O$, $I_O$, etc.) of power supply 202. In one example, controller 104 may include a feedback characteristic that includes entering a shutdown mode when primary side feedback signal 117 exceeds a feedback signal threshold (e.g., too high, too low, etc.). When in the shutdown mode, controller 104 may disable power switch 216 by reducing the duty factor of drive signal 219 to zero. Although FIG. 2 illustrates controller 104 and power switch 216 as separate components, in one example, controller 104 and power switch 216 are integrated together into a single integrated power supply controller circuit.

The example of FIG. 2 illustrates power supply 202 as providing a supply voltage (e.g., $V_O$) to computer 204. Although FIG. 2 illustrates a single output voltage $V_O$ of power supply 202, power supply 202 may provide any number of output voltages, including one or more, as required by computer 204 (e.g., +12V, −12V, +5V, −5V, etc.).

FIG. 2 further illustrates feedback circuit 108 as coupled to output $V_O$ of power supply 202. As shown, feedback circuit 108 provides secondary side feedback signal 113 to isolation interface 110. Feedback circuit 108 may provide secondary side feedback signal 113 substantially responsive to a regulated output (e.g., $V_O$, $I_O$, etc.) of power supply 202. Rectify and filter circuit 215 rectifies and filters the voltage at the output $V_O$.

As shown in FIG. 2, power supply 202 includes a single isolation interface 110 for performing both the feedback function and the remote on/off function, as described above, while at the same time maintaining the galvanic isolation between the primary and secondary sides of power supply 202.

On/off signal 115 may be used to indicate to power supply 202 whether controller 104 should enter the shutdown mode. In the illustrated example, on/off signal 115 is generated by on/off circuit 222 in computer 204. For example, on/off circuit 222 may be included in a standby circuit of computer 204. FIG. 2 illustrates load 218 of computer 204 as being powered by regulated output voltage $V_O$ of power supply 202. However, in one example, computer 204 includes a standby voltage $V_{SB}$. Standby voltage $V_{SB}$ may be a voltage that always remains active regardless of whether computer 204 is turned on or off. Standby voltage $V_{SB}$ may remain active to allow computer 204 to perform certain functions even while computer 204 is turned off. For example, on/off circuit 222 may be powered by standby voltage $V_{SB}$ such that power is available to circuitry even while computer 204 is turned off, such that on/off signal 115 may still be sent to power supply 202 to indicate that supply voltage $V_O$ should be restored to computer 204.

Computer 204 may be a personal computer, a personal digital assistant, or any other suitable computing equivalent capable to run software. As stated above, power supply 202 is coupled to provide a regulated supply voltage to components of computer 204, as represented by load 218. In one example, load 218 includes a processor coupled to a bus. In one example, load 218 also includes one or more of the following: a memory, storage, a display controller, a communications interface, an input/output controller and an audio controller. In another example, computer 204 may be replaced with any electrical device that requires one or more regulated outputs for a load 218.

In one example, a processor included in load 218 and powered by power supply 202 may be a conventional microprocessor, such as one typically found in personal home computers.

Figure 3:
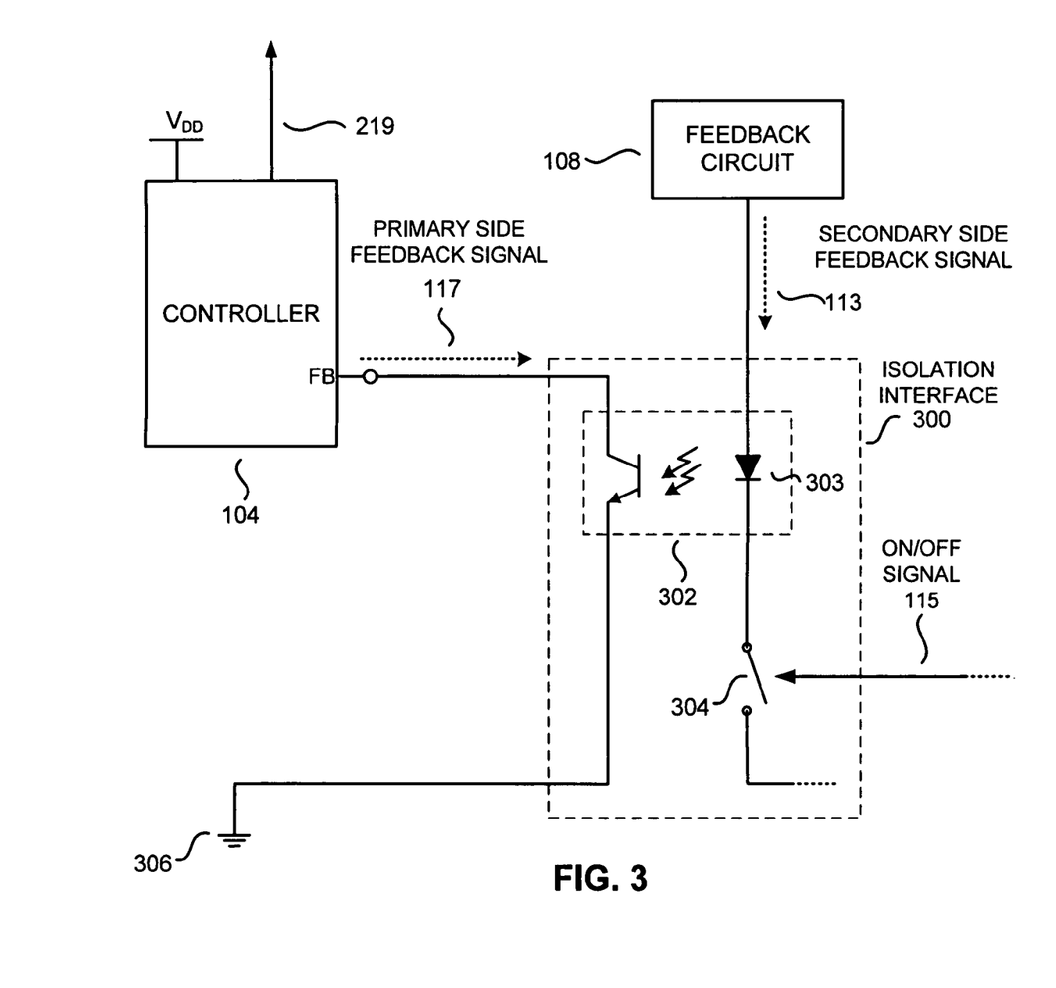
FIG. 3 is a circuit diagram illustrating an isolation interface, in accordance with the teachings of the present invention.

FIG. 3 is a circuit diagram illustrating an isolation interface 300, in accordance with the teachings of the present invention. The illustrated example of isolation interface 300 includes an optocoupler 302 and a switch 304 for providing a feedback function and a remote on/off function. Isolation interface 300 is one possible implementation of isolation interface 110 in FIGS. 1 and 2.

FIG. 3 illustrates primary side feedback signal 117 as a primary feedback current $I_{FB\_PRIMARY}$. As is further shown, primary feedback current $I_{FB\_PRIMARY}$ may be a current flowing out of controller 104 through feedback pin FB. As used herein, a "negative" primary feedback current $I_{FB\_PRIMARY}$ refers to conventional current flowing out from controller 104 through feedback pin FB to an input return 306. FIG. 3 also illustrates secondary side feedback signal 113 as a secondary feedback current $I_{FB\_SECONDARY}$. A "positive" secondary feedback $I_{FB\_SECONDARY}$ refers to conventional current flowing out from feedback circuit 108 through a photodiode 303.

As is shown in the example of FIG. 3, optocoupler 302 receives secondary feedback current $I_{FB\_SECONDARY}$ at photodiode 303 of optocoupler 302 and translates this current into primary feedback current $I_{FB\_PRIMARY}$. As is further shown, switch 304 is coupled to prevent (e.g., block) secondary feedback current $I_{FB\_SECONDARY}$ from flowing through the photodiode in response to on/off signal 115. When switch 304 is disabled (i.e., open) secondary feedback current $I_{FB\_SECONDARY}$ is prevented from flowing through the photodiode and thus primary feedback current $I_{FB\_PRIMARY}$ is correspondingly prevented from flowing through the phototransistor of optocoupler 302. That is, on/off signal 115 may enable and disable switch 304 to adjust the primary feedback current $I_{FB\_PRIMARY}$.

Figure 4:
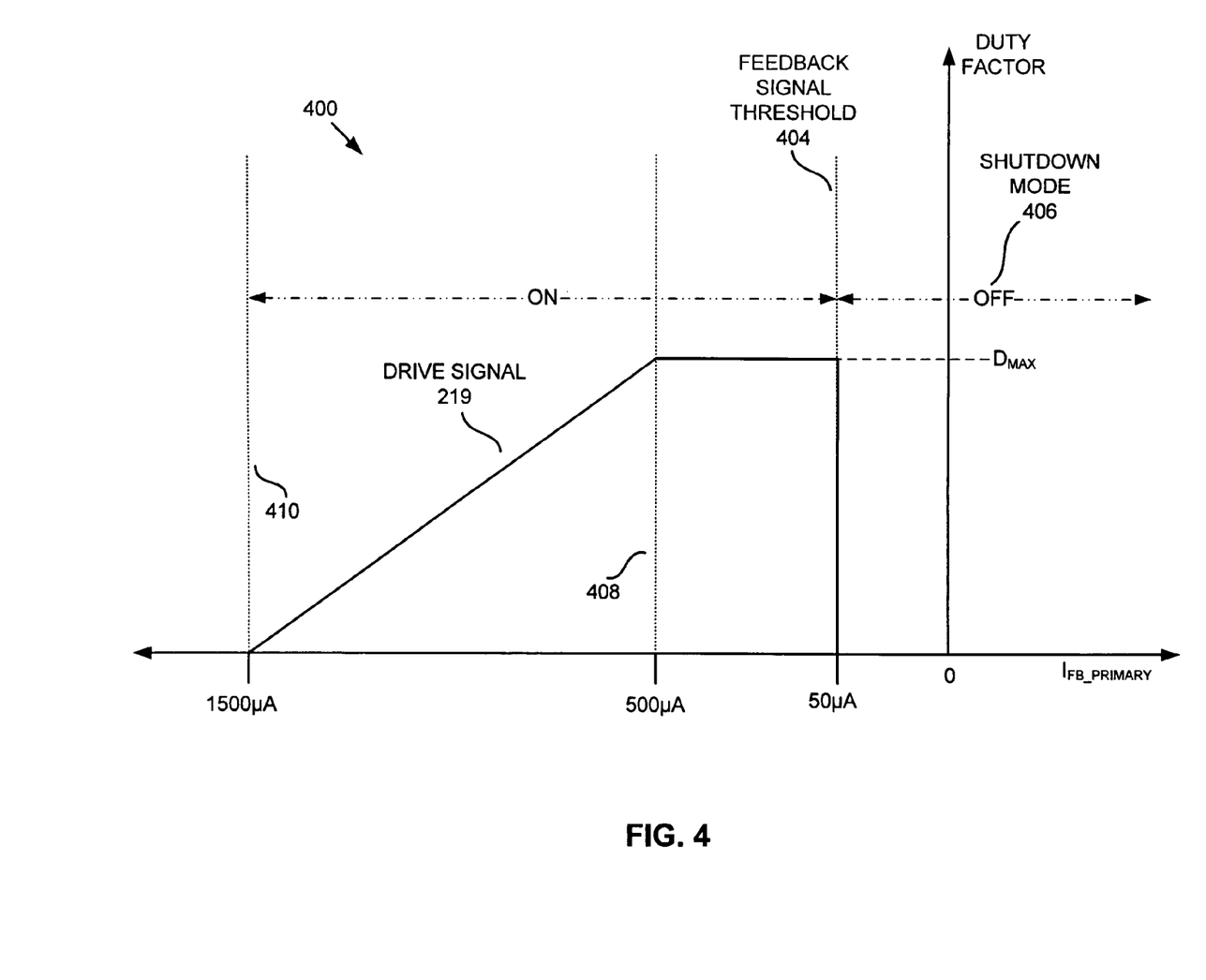
FIG. 4 is a graph illustrating a feedback characteristic of a controller, in accordance with the teachings of the present invention.

FIG. 4 is a graph illustrating a feedback characteristic 400 of controller 104, in accordance with the teachings of the present invention. The example feedback characteristic 400 of FIG. 4 illustrates the duty factor of drive signal 219 as a function of primary feedback current $I_{FB\_PRIMARY}$. As is shown in FIG. 4, feedback characteristic 400 includes a feedback signal threshold 404. For primary feedback currents between feedback signal threshold 404 and threshold 408, the duty factor is a maximum duty factor (i.e., $D_{MAX}$). In the illustrated example, when primary feedback current $I_{FB\_PRI-MARY}$ is between threshold 408 and threshold 410, the duty factor is responsive to primary feedback current $I_{FB\_PRIMARY}$. As stated above, in one example, the duty factor may be the percentage of time drive signal 219 is enabling power switch 216 to conduct over a certain period of time, and thus regulation of the output of the power supply 202 may take place. When the duty factor is zero, controller 104 is preventing power switch 216 from conducting and thus the power supply 202 is turned off. For primary feedback currents greater than (i.e., more positive) than feedback signal threshold 404, the duty factor of drive signal 219 is zero. As further shown in FIG. 4, when the primary feedback current is greater than feedback signal threshold 404, controller 104 is considered in shutdown mode 406 (i.e., off). In another example, when the magnitude of primary feedback current $I_{FB\_PRIMARY}$ reduces to lower than feedback signal threshold 404 controller 104 may perform a variety of other functions other than modulating duty factor in response to a magnitude of primary feedback current $I_{FB\_PRIMARY}$.

The operation of controller 104 with isolation interface 300 is now described with reference to both FIGS. 3 and 4. While switch 304 is enabled (i.e., closed), secondary feedback current $I_{FB\_SECONDARY}$ is allowed to flow through the photodiode of optocoupler 302 so controller 104 is enabled. Optocoupler 302 then translates secondary feedback current $I_{FB\_SECONDARY}$ into primary feedback current $I_{FB\_PRIMARY}$. Provided that primary feedback current $I_{FB\_PRIMARY}$ is less than (i.e., more negative) than feedback signal threshold 404, controller 104 will output drive signal 219 that has a duty factor that is responsive to primary feedback current $I_{FB\_PRIMARY}$. Upon isolation interface 300 receiving on/off signal 115 indicating a power shutdown, switch 304 is disabled, which prevents secondary feedback current $I_{FB\_SECONDARY}$ from flowing through the photodiode. Thus, primary feedback current $I_{FB\_PRIMARY}$ will become more positive until it exceeds feedback signal threshold 404, at which point controller 104 enters shutdown mode 406 and reduces the duty factor of drive signal 219 to zero.

Figure 5:
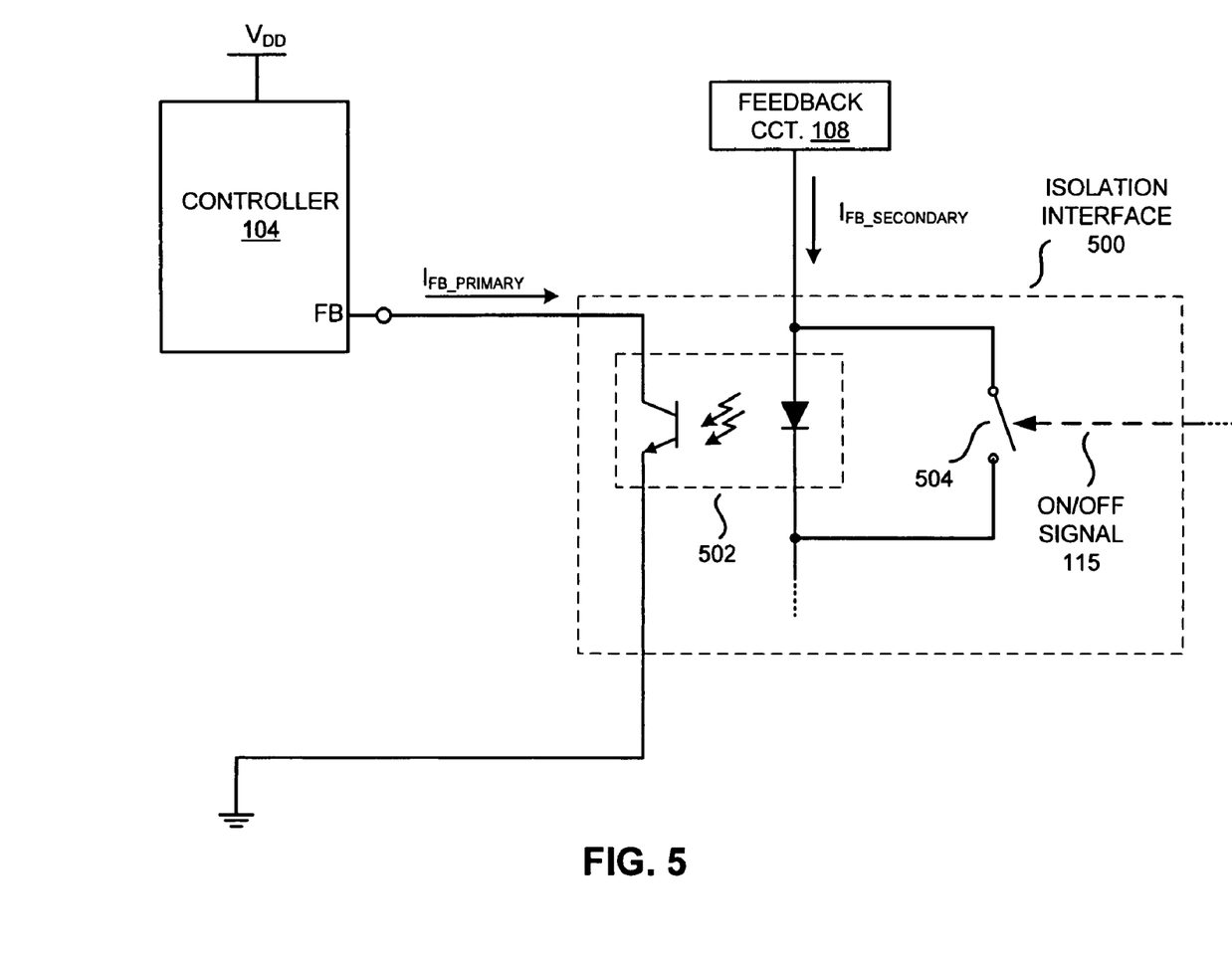
FIG. 5 is a circuit diagram illustrating an isolation interface, in accordance with the teachings of the present invention.

FIG. 5 is a circuit diagram illustrating an isolation interface 500, in accordance with the teachings of the present invention. The illustrated example of isolation interface 500 includes an optocoupler 502 and a switch 504 for providing a feedback function and a remote on/off function. Isolation interface 500 is one possible implementation of isolation interface 110 in FIGS. 1 and 2.

As is shown in the example of FIG. 5, optocoupler 502 receives secondary feedback current $I_{FB\_SECONDARY}$ at a photodiode of optocoupler 502 and translates this current into primary feedback current $I_{FB\_PRIMARY}$. As is further shown, switch 504 is coupled to divert (i.e., shunt) secondary feedback current $I_{FB\_SECONDARY}$ away from the photodiode in response to on/off signal 115. When switch 504 is enabled (i.e., closed) secondary feedback current $I_{FB\_SECONDARY}$ is diverted from the photodiode and thus primary feedback current $I_{FB\_PRIMARY}$ is correspondingly prevented from flowing through the phototransistor of optocoupler 502. That is, on/off signal 115 may enable and disable switch 504 to adjust the primary feedback current $I_{FB\_PRIMARY}$.

Figure 6:
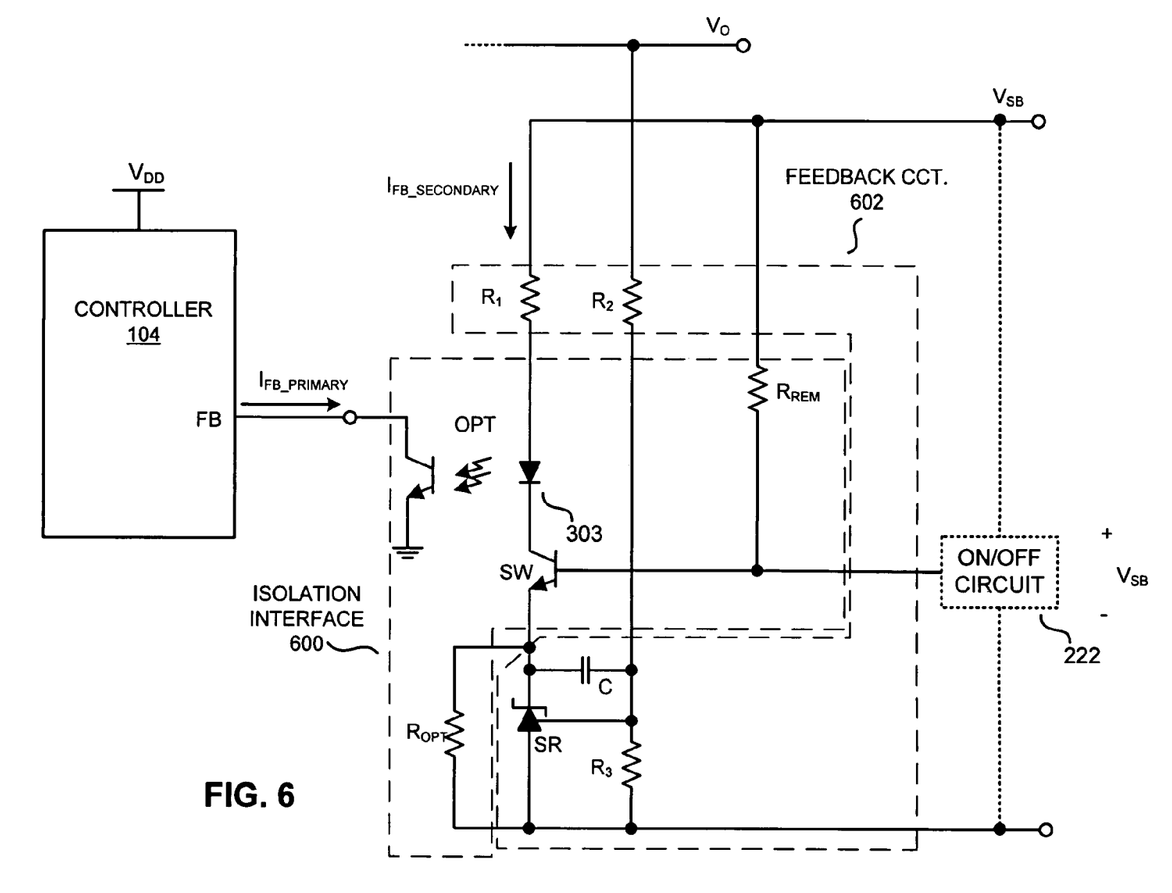
FIG. 6 is a circuit diagram illustrating an isolation interface and a feedback circuit, in accordance with the teachings of the present invention.

FIG. 6 is a circuit diagram illustrating an isolation interface 600 and a feedback circuit 602, in accordance with the teachings of the present invention. Isolation interface 600 is one possible implementation of isolation interface 300 in FIG. 3 and isolation interface 110 in FIGS. 1 and 2. Feedback circuit 602 is one possible implementation of feedback circuit 108 in FIGS. 1-3. The illustrated example of isolation interface 600 includes an optocoupler OPT, a switch SW, a remote resistor $R_{REM}$ and a resistor $R_{OPT}$. Feedback circuit 602 is illustrated as including a capacitor C, a shunt regulator SR, and resistors $R_1$, $R_2$, and $R_3$.

As is shown in FIG. 6, feedback circuit 602 is coupled to a regulated output voltage $V_O$ through resistors $R_2$ and $R_3$. Resistors $R_2$ and $R_3$ form a resistor divider coupled to provide a reference voltage to a reference terminal of shunt regulator SR. In one example, shunt regulator SR regulates a current between the anode and cathode of shunt regulator SR in response to the reference voltage provided by the resister divider of $R_2$ and $R_3$ In one example, shunt regulator SR is a programmable or adjustable shunt regulator (e.g., LM431, TL431, etc.).

During normal operation, as load requirements vary, the regulated output voltage $V_O$ may change, which may cause the reference voltage provided by resister divider $R_2$ and $R_3$ to correspondingly change. In response to a change in the reference voltage at its reference terminal, shunt regulator SR will change the regulated current between its anode and cathode. Thus, the secondary feedback current $I_{FB\_SECONDARY}$ will also correspondingly change thereby providing feedback information for controller 104 in response to variations in output voltage $V_O$. However, certain transient conditions (i.e. load chages) may occur in the regulated output voltage $V_O$ which may cause secondary feedback current $I_{FB\_SECONDARY}$ to become very small, which may inadvertently cause controller 104 to enter the shutdown mode. Thus, isolation interface 600 includes resistor $R_{OPT}$ coupled to provide a minimum current during normal operation (e.g., during regulation of power supply 202). In one example, the minimum current provided by resistor $R_{OPT}$ corresponds to a primary side feedback current $I_{FB\_PRIMARY}$ that is equal to or less than (i.e., more negative) than feedback signal threshold 404 (see FIG. 4), such that controller 104 remains on. Thus, resistor $R_{OPT}$ is coupled to prevent controller 104 from inadvertently entering the shutdown mode in response to transient conditions at the secondary side of a circuit.

As shown in FIG. 6, switch SW may be an NPN bipolar junction transistor. Also included in isolation interface 600 is remote resistor $R_{REM}$. In another example, switch SW may be any type of transistor or switching mechanism that enables photodiode 303. Remote resistor $R_{REM}$ may be included in isolation interface 600 to act as a pull-up or pull-down resistor to control the base of switch SW. For example, in order to turn switch SW on, on/off circuit 222 may provide a high impedance output which causes remote resistor $R_{REM}$ to pull the base of switch SW high, thereby enabling switch SW. Similarly, on/off circuit 222 may turn switch SW off by providing a low impedance output which forces the base of switch SW low and thereby disabling switch SW.

Figure 7:
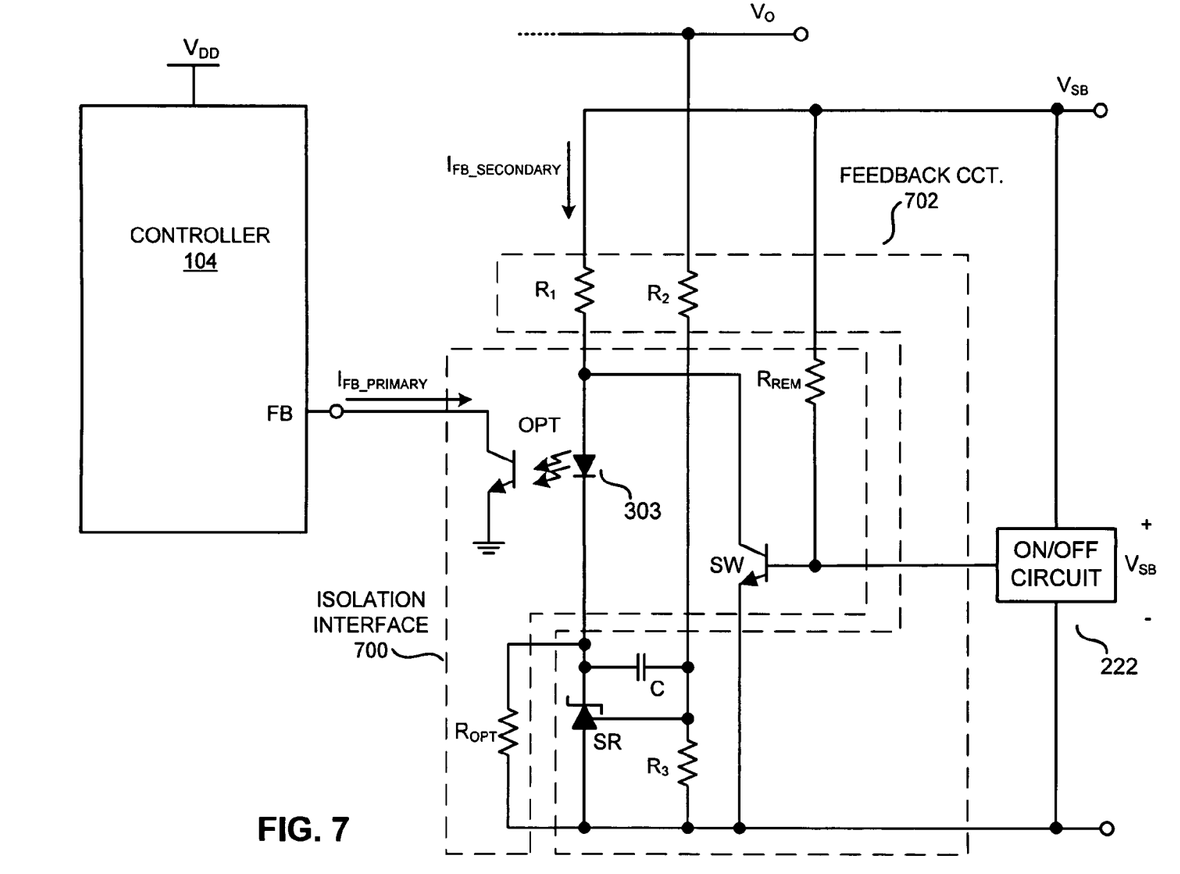
FIG. 7 is a circuit diagram illustrating an isolation interface and a feedback circuit, in accordance with the teachings of the present invention.

FIG. 7 is a circuit diagram illustrating an isolation interface 700 and a feedback circuit 702, in accordance with the teachings of the present invention. Isolation interface 700 is one possible implementation of isolation interface 500 in FIG. 5 and isolation interface 110 in FIGS. 1 and 2. Feedback circuit 702 is one possible implementation of feedback circuit 108 of FIGS. 1, 2 and 5. The illustrated example of isolation interface 700 includes optocoupler OPT, switch SW, remote resistor $R_{REM}$ and resistor $R_{OPT}$. Feedback circuit 702 is illustrated as including a capacitor C, a shunt regulator SR, and resistors $R_1$, $R_2$, and $R_3$. Thus, the enabling of switch SW in isolation interface 700 will result in controller 104 entering the shutdown mode.

As shown in FIG. 7, switch SW is coupled to divert (i.e., shunt) secondary feedback current $I_{FB\_SECONDARY}$ away from the photodiode of optocoupler OPT. Also included in isolation interface 700 is remote resistor $R_{REM}$. Remote resistor $R_{REM}$ may be included in isolation interface 700 to act as a pull-up or pull-down resistor to control the base of switch SW. For example, in order to turn switch SW on, on/off circuit 222 may provide a high impedance output which causes remote resistor $R_{REM}$ to pull the base of switch SW high, thereby enabling switch SW. Similarly, on/off circuit 222 may turn switch SW off by providing a low impedance output which forces the base of switch SW low and thereby disabling switch SW. Thus, in contrast to the embodiment of FIG. 6, the enabling of switch SW in isolation interface 700 will result in controller 104 entering the shutdown mode.

Figure 8:
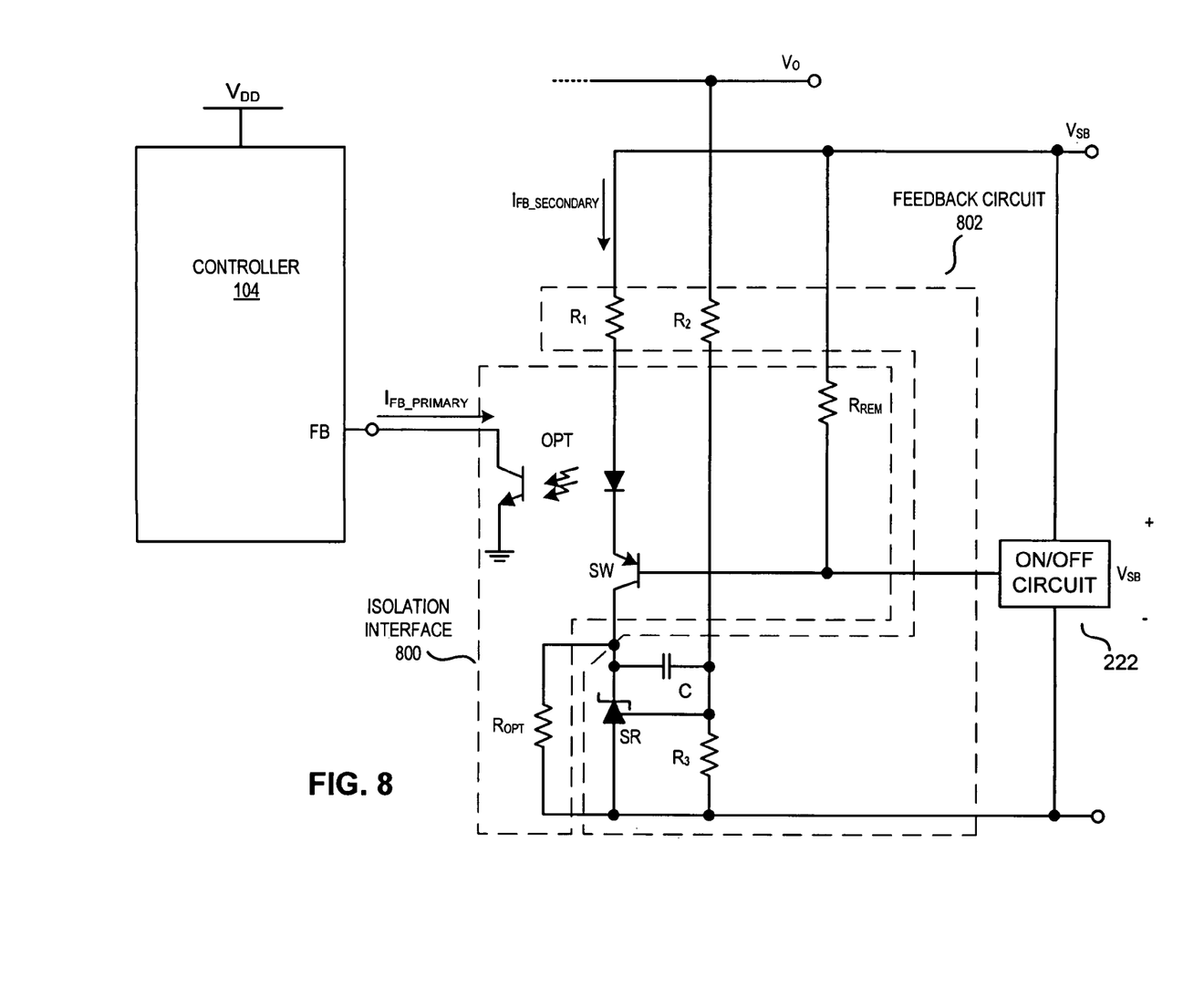
FIG. 8 is a circuit diagram illustrating an isolation interface and a feedback circuit, in accordance with the teachings of the present invention.

FIG. 8 is a circuit diagram illustrating an isolation interface 800 and a feedback circuit 802, in accordance with the teachings of the present invention. Isolation interface 800 is one possible implementation of isolation interface 300 in FIG. 3 and isolation interface 110 in FIGS. 1 and 2. Feedback circuit 802 is one possible implementation of feedback circuit 108 in FIGS. 1-3. The illustrated example of isolation interface 800 includes optocoupler OPT, switch SW, remote resistor $R_{REM}$ and resistor $R_{OPT}$. Feedback circuit 802 is illustrated as including a capacitor C, shunt regulator SR, and resistors $R_1$, $R_2$, and $R_3$.

As shown in FIG. 8, switch SW may be a PNP bipolar junction transistor. Also included in isolation interface 800 is remote resistor $R_{REM}$. Remote resistor $R_{REM}$ may be included in isolation interface 800 to act as a pull-up or pull-down resistor to control the base of switch SW. For example, in order to turn switch SW off, on/off circuit 222 may provide a high impedance output which causes remote resistor $R_{REM}$ to pull the base of switch SW high, thereby disabling switch SW. Similarly, on/off circuit 222 may turn switch SW on by providing a low impedance output which forces the base of switch SW low and thereby enabling switch SW. Thus, the disabling of switch SW in isolation interface 800 will result in controller 104 entering the shutdown mode.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A circuit, comprising:
    a controller included in a primary side of the circuit, wherein the controller is coupled to receive a primary side feedback signal, wherein the controller is configured to enter a shutdown mode when the primary side feedback signal exceeds a feedback signal threshold; and
    an isolation interface coupled to galvanically isolate the primary side from a secondary side of the circuit, wherein the isolation interface translates a secondary side feedback signal from the secondary side into the primary side feedback signal on the primary side, and wherein the isolation interface includes a switch that is controlled in response to an on/off signal to adjust the primary side feedback signal to exceed the feedback signal threshold.

2. The circuit of claim 1, further comprising a feedback circuit included in the secondary side of the circuit and coupled to generate the secondary side feedback signal in response to an output of the circuit.

3. The circuit of claim 1, wherein the controller is coupled to generate a drive signal having a duty factor responsive to the primary side feedback signal.

4. The circuit of claim 3, wherein the feedback signal threshold is a first feedback signal threshold, wherein the duty factor is a maximum duty factor when the primary side feedback signal is between the first feedback signal threshold and a second feedback signal threshold.

5. The circuit of claim 4, wherein the duty factor is proportional to the primary side feedback signal when the primary side feedback signal is between the second feedback signal threshold and a third feedback signal threshold.

6. The circuit of claim 3, wherein the controller is further configured to reduce the duty factor of the drive signal to zero when in the shutdown mode.

7. The circuit of claim 1, wherein the primary side feedback signal is a current flowing out of a feedback pin of the controller.

8. The circuit of claim 7, wherein the feedback signal threshold is a negative current value.

9. The circuit of claim 1, wherein the feedback signal threshold is a nonzero feedback signal threshold.

10. The circuit of claim 1, wherein the isolation interface includes an optocoupler to galvanically isolate the primary side from the secondary side of the circuit.

11. The circuit of claim 10, wherein the secondary side feedback signal is a current flowing into a photodiode of the optocoupler, the switch coupled to reduce the current flowing into the photodiode of the optocoupler in response to the on/off signal.

12. The circuit of claim 11, wherein the switch is coupled to substantially divert the current away from the photodiode of the optocoupler.

13. The circuit of claim 11, wherein the switch is a bipolar junction transistor.

14. The circuit of claim 11, wherein the switch is coupled to substantially block the current from flowing through the photodiode.

15. The circuit of claim 1, wherein the secondary side of the circuit is to be coupled to a computer including an on/off circuit to generate the on/off signal.

16. The circuit of claim 1, wherein the on/off signal includes a high impedance state and a low impedance state, wherein the isolation interface further comprises a resistor coupled to pull-up the on/off signal to a voltage during the high impedance state.

17. A power supply, comprising:
a controller included in a primary side of the power supply, wherein the controller is coupled regulate an output of the power supply in response to a primary side feedback signal, wherein the controller is configured to enter a shutdown mode when the primary side feedback signal exceeds a feedback signal threshold; and
an isolation interface coupled to galvanically isolate the primary side from a secondary side of the power supply, wherein the isolation interface receives a secondary side feedback signal from the secondary side and provides the primary side feedback signal to the controller, and wherein the isolation interface is configured to adjust the primary side feedback signal to exceed the feedback signal threshold in response to an on/off signal that is generated by circuitry external to the power supply.

18. The power supply of claim 17, further comprising a power switch included in the primary side of the power supply, wherein the controller is further configured to control switching of the power switch to regulate the output of the power supply and to disable the power switch when in the shutdown mode.

19. The power supply of claim 17, wherein the power switch and the controller are integrated together into a single integrated power supply controller circuit.

20. The power supply of claim 17, wherein the primary side feedback signal is a current flowing out of a feedback pin of the controller.

21. The power supply of claim 17, wherein the feedback signal threshold is a nonzero feedback signal threshold.

22. The power supply of claim 17, wherein the isolation interface includes an optocoupler to galvanically isolate the primary side from the secondary side of the power supply.

23. The power supply of claim 22, wherein the secondary side feedback signal is a current flowing into a photodiode of the optocoupler, the isolation interface further including a switch coupled to reduce the current flowing into the photodiode of the optocoupler in response to the on/off signal.

24. The power supply of claim 23, wherein the switch is coupled to substantially divert the current away from the photodiode of the optocoupler.

25. The power supply of claim 23, further comprising a feedback circuit included in the secondary side of the power supply and coupled to generate the secondary side feedback signal in response to the output of the circuit.

26. The power supply of claim 25, wherein the feedback circuit includes a shunt regulator coupled to adjust the current flowing through the photodiode in response to the output of the power supply, and wherein the isolation interface includes a bypass resistor coupled to the shunt regulator to provide a minimum current flow through the photodiode during regulation of the power supply.

27. The power supply of claim 26, wherein minimum current flow through the photodiode corresponds to the primary side feedback signal exceeding the feedback signal threshold.

28. The power supply of claim 27, wherein the primary side feedback signal exceeding the feedback signal includes the primary side feedback signal increasing to a more positive value than the feedback signal threshold.

29. The power supply of claim 17, wherein the secondary side of the power supply is to be coupled to a computer including an on/off circuit to generate the on/off signal.

30. A method, comprising:
galvanically isolating a secondary side of a circuit from a primary side of the circuit with an isolation interface;
translating a secondary side feedback signal from the secondary side of the circuit into a primary side feedback signal on the primary side of the circuit with the isolation interface;
receiving an on/off signal at the isolation interface; and
controlling a switch with the on/off signal to adjust the primary side feedback signal to exceed a feedback signal threshold of a controller, wherein the controller enters a shutdown mode when the primary side feedback signal exceeds the feedback signal threshold.

31. The method of claim 30, further comprising regulating an output of a power supply with the controller in response to the primary side feedback signal.

32. The method of claim 31, wherein regulating an output of the power supply with the controller in response to the primary side feedback signal includes generating a drive signal having a duty factor responsive to the primary side feedback signal, wherein the feedback signal threshold is a first feedback signal threshold and wherein the controller includes the first, a second and a third feedback signal threshold, the method further comprising:

reducing the duty factor of the drive signal to zero when the primary side feedback signal exceeds the feedback signal threshold;

increasing the duty factor of the drive signal to a maximum duty factor when the primary side feedback signal is between the first feedback signal threshold and the second feedback signal threshold; and adjusting the duty factor proportional to the primary side feedback signal when the primary side feedback signal is between the second feedback signal threshold and the third feedback signal threshold.

* * * * *